US006357350B1

(12) United States Patent
Kerr

(10) Patent No.: US 6,357,350 B1
(45) Date of Patent: Mar. 19, 2002

(54) ALUMINUM FOAM CORE VACUUM IMAGING DRUM AND METHOD OF DRUM FABRICATION

(75) Inventor: Roger S. Kerr, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/515,303

(22) Filed: Feb. 29, 2000

(51) Int. Cl.[7] .............................................. G01D 15/28
(52) U.S. Cl. .................. 101/389.1; 346/138; 101/407.1
(58) Field of Search .......................... 346/138; 400/659, 400/662; 101/407.1, 389.1

(56) References Cited

U.S. PATENT DOCUMENTS 5,183,252 A 2/1993 Wolber et al. .............. 271/276
5,268,708 A 12/1993 Harshbarger et al. ....... 346/134
5,276,464 A 1/1994 Kerr et al. .................. 346/134
5,376,954 A 12/1994 Kerr ........................... 346/138
5,424,813 A * 6/1995 Schlueter, Jr. et al. ...... 399/239
5,873,014 A * 2/1999 Knapp et al. ............... 399/249
5,964,133 A 10/1999 Kerr ........................... 346/134
6,002,419 A 12/1999 Kerr et al. .................. 342/233

FOREIGN PATENT DOCUMENTS

JP 63-193863 * 8/1988

* cited by examiner

*Primary Examiner*—Daniel J. Colilla
(74) *Attorney, Agent, or Firm*—Nelson Adrian Blish

(57) ABSTRACT

An aluminum foam core vacuum imaging drum (14) comprised of an aluminum foam cylinder (70) having a densified surface (72). A first metal layer (75) covers the densified surface (72), and vacuum holes (130) in the first metal layer (75) connect a surface of the first metal layer (75) to an interior of the aluminum foam cylinder (70). In one embodiment, the aluminum foam cylinder (70) is fabricated using open-cell aluminum foam construction.

14 Claims, 3 Drawing Sheets

ALUMINUM FOAM CORE VACUUM IMAGING DRUM AND METHOD OF DRUM FABRICATION

FIELD OF THE INVENTION

This invention relates in general to a laser printer and more particularly relates to a vacuum drum fabricated from an aluminum foam core.

BACKGROUND OF THE INVENTION

Pre-press color proofing is a procedure used by the printing industry to create representative images of printed material. This procedure avoids the high cost and time required to produce printing plates and set-up a high-speed, high-volume printing press to produce a single intended image for proofing prior to a production run of the intended image. In the absence of pre-press proofing, a production run may require several corrections to the intended image to satisfy customer requirements, and each of the intended images would require a new set of printing plates. By utilizing pre-press color proofing, time and money are saved.

A laser thermal printer having half-tone color proofing capabilities is disclosed in commonly assigned U.S. Pat. No. 5,268,708 titled "Laser Thermal Printer With An Automatic Material Supply," issued Dec. 7, 1993 in the name of R. Jack Harshbarger, et al. The Harshbarger, et al. device is capable of forming an image on a sheet of thermal print media by transferring dye from dye donor material to thermal print media. This is achieved by applying thermal energy to the dye donor material to form an image on the thermal print media. This apparatus comprises a material supply assembly; a lathe bed scanning subsystem, which includes a lathe bed scanning frame, a translation drive, a translation stage member, a laser printhead; a rotatable vacuum imaging drum; and exit transports for the thermal print media and dye donor material.

The Harshbarger, et al. apparatus meters a length of the thermal print media in roll form from a material supply assembly. The thermal print media is measured and cut into sheets of the required length, transported to the vacuum imaging drum, and wrapped around and secured to the vacuum imaging drum. A length of dye donor roll material is metered out of the material supply ssembly, measured, and cut into sheets of the required length. The cut sheet of dye donor roll material is transported to and wrapped around the vacuum imaging drum, and superposed in registration with the thermal print media. The scanning subsystem traverses the printhead axially along the rotating vacuum imaging drum to produce the image on the thermal print media. The image is written in a single swath, traced out in a continuous spiral, concentric with the imaging drum, as the printhead is moved parallel to the drum axis.

Although the printer disclosed in the Harshbarger, et al. performs well, there is a long-felt need to reduce manufacturing costs for this type of printer and for similar types of imaging apparatus. In particular, improvements which would lower the cost and complexity of the vacuum imaging drum would be advantageous for reducing overall system cost and improving long-term equipment performance.

The imaging drum disclosed in Harshbarger, et al. is constructed using a hollow, machined vacuum drum, finished and assembled as disclosed in U. S. Pat. Nos. 5,964,133, 5,376,954, 5,276,464 and 6,002,419. Considerable assembly time and cost are involved in fabricating the imaging drum and in balancing the drum to allow proper rotation at the high speeds used during imaging. Drum weight in excess of 30 lbs. is a significant factor in the design of the supporting chassis structure, which is a machined casting in the apparatus disclosed in Harshbarger, et al. The inertia of the heavy drum adversely impact system throughput, since time is needed to accelerate the drum to writing speed and to slow the drum to a stop to unload media after writing. Additionally, the mass of the drum wall causes some distortion, which may be due to uneven vacuum distribution, as is noted in U.S. Pat. No. 5,183,252 (Wolber et al.)

Substitution of lighter metals for an imaging drum can reduce the weight of the drum, but present other problems such as higher materials cost, lower resistance to oxidation and corrosion, and reduced structural strength. Aluminum foam core material has been used in aeronautical, heat exchange, and other applications due to its light weight and favorable thermal response properties. However, perhaps because conventional foam core material lacks a finished surface, this material has not been employed for imaging drum fabrication.

There has been a long-felt need to reduce the cost, complexity, and weight of a vacuum imaging drum without compromising dimensional stability and performance. However, up to this time, conventional imaging drum solutions have been limited to the use of conventional machined tubing.

SUMMARY OF THE INVENTION

It is the object of the present invention to provide a lightweight vacuum imaging drum for an image processing system and a method for producing such an imaging drum.

According to one aspect of the present invention, an aluminum foam core vacuum imaging drum is comprised of an aluminum foam cylinder having a densified surface. A first metal layer covers the densified surface, and vacuum holes in the first metal layer connect a surface of the first metal layer to an interior of the aluminum foam cylinder. In one embodiment, the aluminum foam cylinder is fabricated using open-cell aluminum foam core construction.

According to an embodiment of the present invention, a vacuum imaging drum is fabricated from a cylindrical core of open-cell aluminum foam core material. End plates are pressed into place on the top and bottom sides of the cylindrical core for bearings and mounting. The outer surface of the cylindrical core is compacted for increased density, then covered with a uniform metal coating. The surface of the drum is be machined to provide the appropriate arrangement of orifices for providing a hold-down vacuum for thermal and dye donor media.

An advantage of the present invention is that a lightweight imaging drum is produced. This simplifies the design of support components for starting and stopping the drum and reduces the amount of structural support required from a print engine chassis and frame assembly. A further advantage of lightweight construction is that it simplifies the task of balancing the drum for high-speed operation.

The invention and its objects and advantages will become more apparent in the detailed description of the preferred embodiment presented below.

BRIEF DESCRIPTION OF THE DRAWINGS

While the specification concludes with claims particularly pointing-out and distinctly claiming the subject matter of the present invention, the invention will be better understood from the following description when taken in conjunction with the accompanying drawings.

DETAILED DESCRIPTION OF THE INVENTION

The present description will be directed in particular to elements forming part of, or cooperating more directly with, an apparatus in accordance with the invention. It is to be understood that elements not specifically shown or described may take various forms well known to those skilled in the art.

Figure 1:
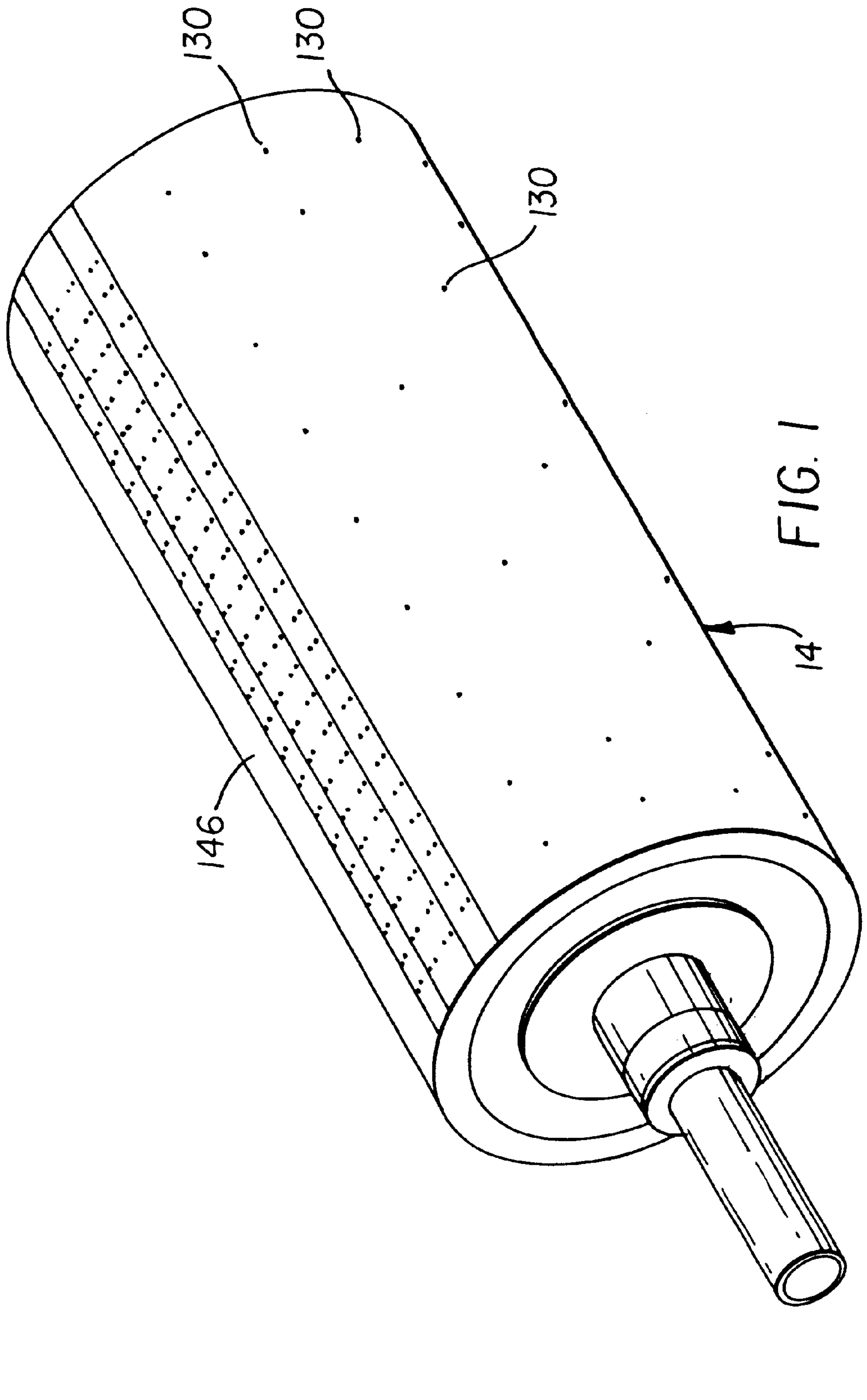
FIG. 1 is a view in perspective of a vacuum imaging drum according to the present invention.
Figure 2:
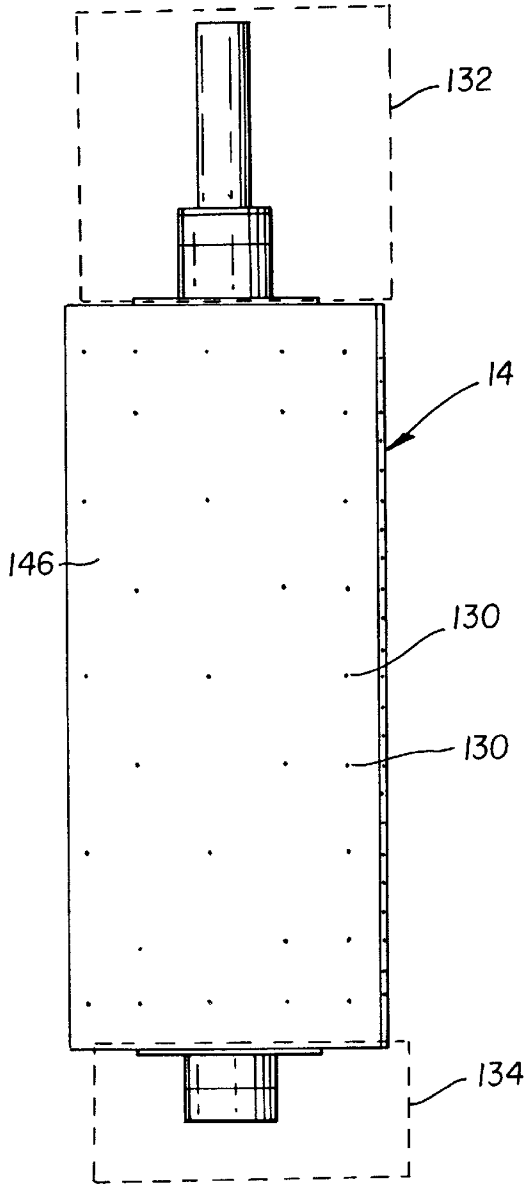
FIG. 2 is a plane view of the vacuum imaging drum show in FIG. 1.

Referring to FIGS. 1 and 2, there is shown a vacuum imaging drum 14 for an imaging system such as a laser thermal printer. Vacuum imaging drum 14 has a drum surface 146 containing vacuum holes 130. Vacuum holes 130 are provided in the drum surface 146 for holding media on the vacuum imaging drum 14 surface. FIG. 1 shows vacuum imaging drum 14 as viewed from the drive end. FIG. 2 shows a plane view of vacuum imaging drum 14 with drive end components represented by the dotted box labeled 132 and vacuum end components represented by the dotted box labeled 134.

Figure 4:
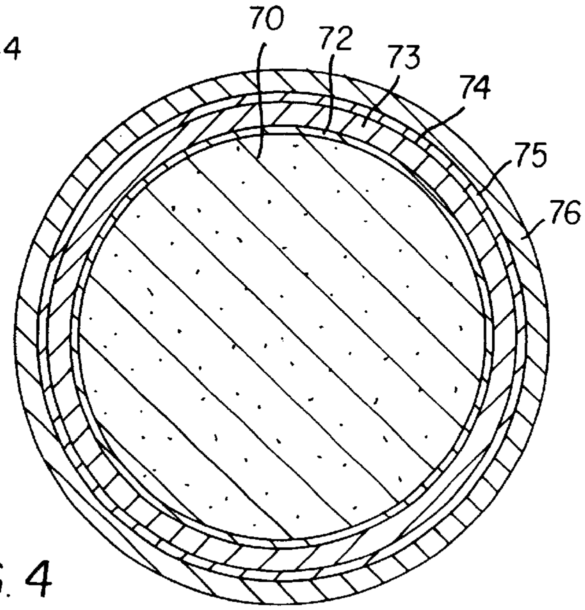
FIG. 4 is a cross-sectional view of a vacuum imaging drum along the lines AA shown in FIG. 3.

Vacuum imaging drum 14 is fabricated using an aluminum foam cylinder 70, shown in FIG. 4. The preferred embodiment uses DUOCELL Aluminum Foam, manufactured by ERG Materials and Aerospace Corporation, located in Oakland, Calif. The DUOCELL Aluminum Foam material has a reticulated structure having a matrix of open, duodecahedronal-shaped cells that are connected by continuous, solid metal ligaments. This matrix structure gives the aluminum foam material excellent rigidity and controlled metal density per unit volume. Similar aluminum foam products could be used; however, regularity of the cell matrix structure is an important characteristic, since this controls density, and can vary from one type of aluminum foam to another.

For vacuum imaging drum 14 fabrication, the aluminum foam material is provided in cylindrical form. In this form, the core surface is unfinished. It is necessary to first "density," that is, to prepare this surface to provide it with sufficient density for receiving a smooth finish. In the preferred embodiment, the core surface is prepared by rolling the aluminum foam cylinder 70 against a flat surface. This compresses the open cells on the core surface in an even fashion, to provide a densified surface 72, which facilitates surface treatment.

Once the core surface is densified, a smooth finish can be applied. In the preferred embodiment, a plasma coating technique, well known in the metal finishing art, is employed to apply a thick film of metal coating 73 uniformly along the core surface. For the preferred embodiment, a coating of 0.060 in. (nominal) is sufficient for the vacuum requirements of the imaging application. The core surface is built up on top of a supporting aluminum foam core. For this reason, the thickness of deposited metal on the core surface can be much less than the required thickness of the wall of a hollow vacuum imaging drum. A layer of 0.060 in. total thickness, for example, provides approximately 0.030 in. penetration of the foam material, to fill core cavities near the drum surface, with approximately 0.030 in. of surface build-up applied.

After the metal coating 73 is applied, a surface machining and grinding process is desirable to provide a finished surface 74. The preferred embodiment employs application of two metals. A first metal layer 75, in this embodiment, an undercoating of aluminum is applied and machined. A second metal layer 76, in this embodiment, stainless steel is then applied, machined, and ground to provide a suitable finish to form drum surface 146.

As a final step in vacuum imaging drum 14 fabrication, vacuum holes 130 are drilled in drum surface 146. As FIG. 1 shows, the pattern of vacuum holes 130 can be adapted to suit the requirements for gripping media on vacuum imaging drum 14, with generally more vacuum holes 130 corresponding to lead and trailing edges of media when loaded onto vacuum imaging drum 14.

Figure 3:
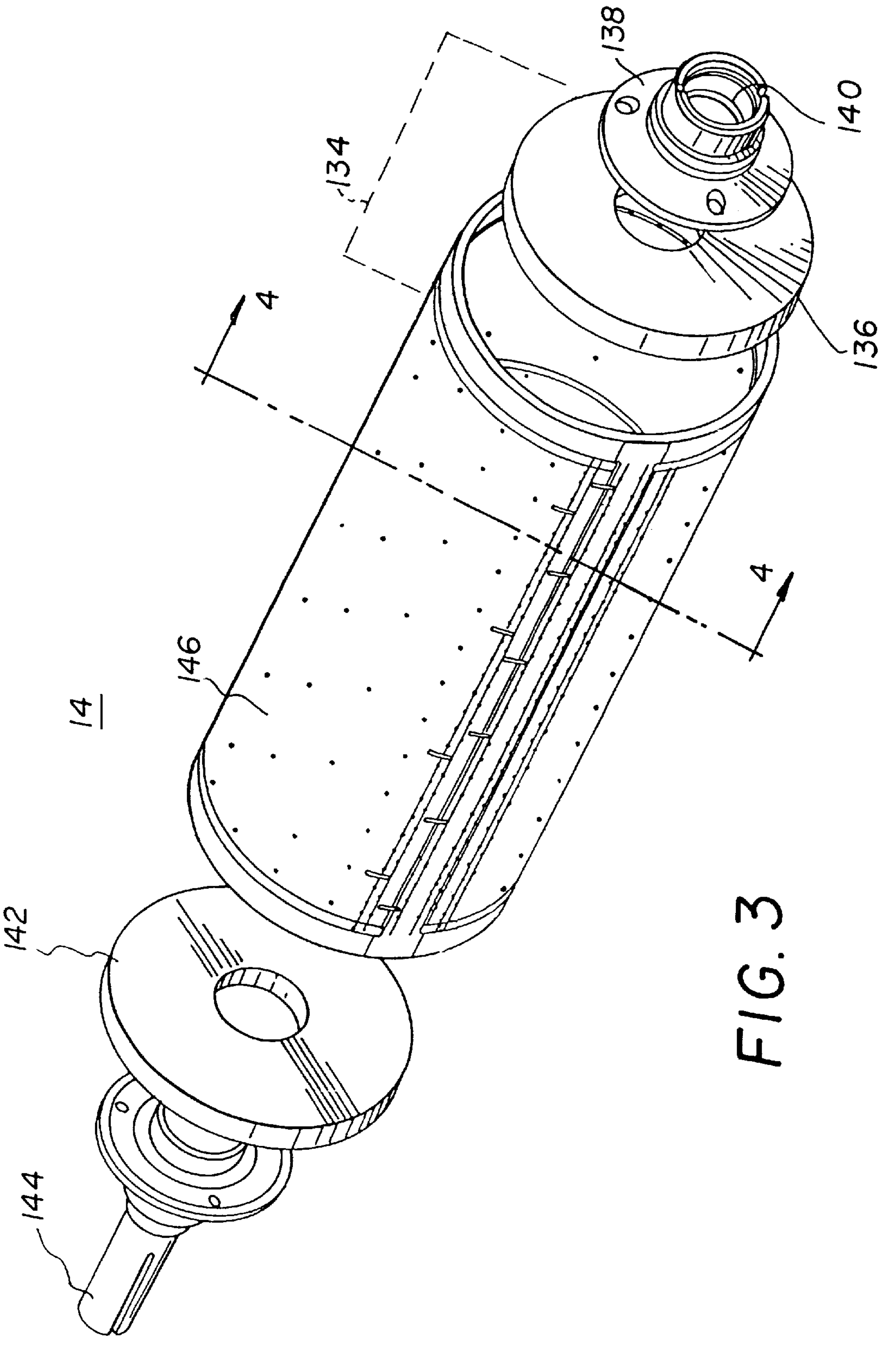
FIG. 3 is an exploded view of the vacuum imaging drum shown in FIG 1.

Referring to FIG. 3, there is shown an exploded view of vacuum imaging drum 14 components. The ends of vacuum imaging drum 14 are closed by a vacuum end plate 136 and a drive end plate 142. Drive end plate 142 is provided with a centrally disposed drive spindle 144 which extends outwardly therefrom for fitting with a support bearing (not shown). Similarly, vacuum end plate 136 is provided with a centrally disposed vacuum spindle 138 which extends outwardly therefrom for fitting with a support bearing (not shown). A central vacuum opening 140 is in alignment with a vacuum fitting (not shown) as is well known in the imaging drum art.

While the invention has been described with particular reference to its preferred embodiments, it will be understood by those skilled in the art that various changes may be made and equivalents may be substituted for elements of the preferred embodiments without departing from the invention. For example, the step of densification of core surface can be performed in a number of alternate ways. A thin layer of foil, such as aluminum foil, or some other film material could be applied as a "sacrificial layer" to drum surface 146 prior to adding the finish layer. There are a number of alternate methods for attachment of end plates to the aluminum foam core, including welding and press-fitting. While a laser thermal printer has been described in the preferred embodiment, the invention applies to other imaging systems which incorporate a vacuum imaging drum.

What is claimed is:

1. An aluminum foam core vacuum imaging drum comprising:

an aluminum foam cylinder having a densified surface;

a first metal layer on said densified surface; and vacuum holes connecting a surface of said metal layer to an interior of said aluminum foam cylinder.

2. An aluminum foam core vacuum imaging drum as in claim 1 wherein said aluminum foam cylinder is comprised of a matrix of open, duodecahedronal-shaped cells.

3. An aluminum foam core vacuum imaging drum as in claim 1 wherein end plates are press fitted onto a first end and a second end of said aluminum foam cylinder.

4. An aluminum foam core vacuum imaging drum as in claim 1 wherein said first metal surface has a coating of approximately 0.060 inches.

5. An aluminum foam core vacuum imaging drum as in claim 1 wherein said first metal layer penetrates approximately 0.003 inches into a surface of said aluminum foam cylinder.

6. An aluminum foam core vacuum imaging drum as in claim 1 wherein said first metal layer is aluminum.

7. An aluminum foam core vacuum imaging drum as in claim 1 wherein a second metal layer covers said first metal layer.

8. An aluminum foam core vacuum imaging drum as in claim 1 wherein said second metal layer is stainless steel.

9. A method of fabricating a vacuum imaging drum for holding imaging media on a surface of said drum comprising the steps of:

(a) providing aluminum foam cylinder;

(b) densifying a surface of said of aluminum foam cylinder;

(c) applying a first layer to said surface of said aluminum foam cylinder to build up a finished surface; and (d) drilling vacuum holes in said finished surface.

10. The method of claim 9 wherein the step of densifying said surface of said aluminum foam cylinder comprises a step of rolling a cylindrical core against a flat plane surface.

11. The method of claim 9 wherein the step of densifying said surface of said aluminum foam cylinder comprises a step of affixing a layer of metal foil to said surface of a cylindrical core of aluminum foam material.

12. The method of claim 9 wherein the step of applying a finish to said surface of said aluminum foam cylinder comprises applying a metal by plasma coating.

13. The method of claim 9 comprising the additional step of:

attaching end plate hardware to a first end and a second end of said of aluminum foam cylinder.

14. The method of claim 9 comprising the additional step of machining said finished surface.

* * * * *